United States Patent
Chen

(10) Patent No.: US 11,134,405 B2
(45) Date of Patent: Sep. 28, 2021

(54) MEASUREMENT METHOD AND USER EQUIPMENT

(71) Applicant: VIVO MOBILE COMMUNICATION CO.,LTD., Guangdong (CN)

(72) Inventor: Li Chen, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 0 days.

(21) Appl. No.: 16/634,095

(22) PCT Filed: Jul. 6, 2018

(86) PCT No.: PCT/CN2018/094826
§ 371 (c)(1),
(2) Date: Jan. 24, 2020

(87) PCT Pub. No.: WO2019/019896
PCT Pub. Date: Jan. 31, 2019

(65) Prior Publication Data
US 2020/0187036 A1     Jun. 11, 2020

(30) Foreign Application Priority Data
Jul. 27, 2017 (CN) .......................... 201710626404.5

(51) Int. Cl.
| | |
|---|---|
| *H04W 24/10* | (2009.01) |
| *H04W 76/27* | (2018.01) |
| *H04W 4/02* | (2018.01) |
| *H04W 8/24* | (2009.01) |
| *H04W 48/16* | (2009.01) |
| *H04W 52/02* | (2009.01) |

(52) U.S. Cl.
CPC ........... *H04W 24/10* (2013.01); *H04W 4/027* (2013.01); *H04W 8/24* (2013.01); *H04W 48/16* (2013.01); *H04W 52/0251* (2013.01); *H04W 76/27* (2018.02)

(58) Field of Classification Search
CPC ..... H04W 24/10; H04W 76/27; H04W 4/027; H04W 8/24; H04W 48/16; H04W 52/0251
USPC ........................................................ 370/329
See application file for complete search history.

(56) References Cited

U.S. PATENT DOCUMENTS 9,301,190 B2    3/2016   Deng et al.
9,668,191 B2 *  5/2017   Makh ................ H04W 36/0094
(Continued)

FOREIGN PATENT DOCUMENTS

CN      1856152 A      11/2006
CN    102143505 A       8/2011
(Continued)

OTHER PUBLICATIONS

European Search Report in Application No. 18837295.7 dated Jun. 19, 2020.
(Continued)

*Primary Examiner* — Mong-Thuy T Tran
(74) *Attorney, Agent, or Firm* — Maschoff Brennan

(57) ABSTRACT

A measurement method and User Equipment UE are provided. The method includes: determining a measurement-related parameter of the UE according to a state parameter of the UE; and performing a measurement on a neighboring cell of the UE and/or a serving cell of the UE according to the measurement-related parameter.

20 Claims, 5 Drawing Sheets

(56) References Cited

U.S. PATENT DOCUMENTS

| | | | |
|---|---|---|---|
| 9,716,559 B2 | 7/2017 | Chou | |
| 2012/0295610 A1 | 11/2012 | Deng et al. | |
| 2014/0148174 A1 | 5/2014 | Teyeb et al. | |
| 2014/0171086 A1 | 6/2014 | Nakamori et al. | |
| 2014/0194125 A1 | 7/2014 | Wen et al. | |
| 2015/0350976 A1* | 12/2015 | Kodali | H04W 48/16 455/440 |
| 2016/0234710 A1* | 8/2016 | Jung | H04W 76/19 |
| 2016/0301486 A1 | 10/2016 | Joey | |
| 2018/0146410 A1* | 5/2018 | Cho | H04W 36/0061 |
| 2019/0014492 A1* | 1/2019 | Kim | H04W 36/08 |
| 2019/0045416 A1 | 2/2019 | Hwang et al. | |
| 2019/0357112 A1* | 11/2019 | Shen | H04W 36/30 |

FOREIGN PATENT DOCUMENTS

| | | |
|---|---|---|
| CN | 102547833 A | 7/2012 |
| CN | 102572989 A | 7/2012 |
| CN | 102769879 A | 11/2012 |
| CN | 102905286 A | 1/2013 |
| CN | 103797846 A | 5/2014 |
| CN | 104350776 A | 2/2015 |
| CN | 105493551 A | 4/2016 |
| CN | 105519188 A | 4/2016 |
| CN | 105636106 A | 6/2016 |
| CN | 105814933 A | 7/2016 |
| CN | 105828371 A | 8/2016 |
| EP | 2 533 562 A1 | 12/2012 |
| EP | 2 667 663 A1 | 11/2013 |
| WO | 2017/044025 A1 | 3/2017 |
| WO | 2017/123009 A1 | 7/2017 |

OTHER PUBLICATIONS

CN Office Action in Application No. 201710626404.5 dated Nov. 27, 2019.
CN Office Action in Application No. 201710626404.5 dated Mar. 16, 2020.
CN Office Action in Application No. 201710626404.5 dated Jun. 18, 2020.
"NR UE power saving" 3GPP TSG RAN WG1 Meeting #92bis, Apr. 16, 2018.
"Idle measurement enhancement using UE speed", 3GPP TSG-RAN WG2 Meeting NR AH#2, Jun. 27, 2017.
Written Opinion and International Search Report in Application No. PCT/CN2018/094826 dated Sep. 19, 2018.
CN Search Report dated Nov. 18, 2019 as received in Application No. 201710626404.5.
CN Office Action dated Nov. 27, 2019 as received in Application No. 201710626404.5.

* cited by examiner

MEASUREMENT METHOD AND USER EQUIPMENT

CROSS-REFERENCE TO RELATED APPLICATION

This application is the U.S. national phase of PCT Application No. PCT/CN2018/094826 filed on Jul. 6, 2018, which claims a priority to the Chinese patent application No. 201710626404.5 filed in China on Jul. 27, 2017, disclosures of which are incorporated herein by reference in their entireties.

TECHNICAL FIELD

The present disclosure relates to the field of communication technologies, and in particular to a measurement method and a user equipment.

BACKGROUND

At present, a user terminal (User Equipment, UE for short) in an idle mode triggers a cell measurement in accordance with a uniform condition, no matter whether the UE is a stationary UE, or a UE at a low mobile speed, or a UE at a high mobile speed. There is no differentiated configuration with respect to a mobile state of the UE, an environment where the UE is located, or a coverage, which is not conducive to save power for some UEs in a stationary state or moving at a quite low speed, in a case that there is a small change in channel environment.

SUMMARY

In a first aspect, the present disclosure provides a measurement method, which is applicable to a User Equipment UE. The method includes:

determining a measurement-related parameter of the UE according to a state parameter of the UE; and performing a measurement on a neighboring cell of the UE and/or a serving cell of the UE according to the measurement-related parameter.

In a second aspect, the present disclosure further provides a User Equipment UE, including:

a determination module, configured to determine a measurement-related parameter of the UE according to a state parameter of the UE; and a measurement module, configured to perform a measurement on a neighboring cell of the UE and/or a serving cell of the UE according to the measurement-related parameter.

In a third aspect, the present disclosure further provides a User Equipment, including a processor, a memory, and a measurement program that is stored on the memory and executable on the processor. When executing the measurement program, the processor is configured to implement steps of the measurement method as described above.

In a fourth aspect, the present disclosure further provides a computer-readable storage medium on which a measurement program is stored. The measurement program is executed by a processor to implement steps of the measurement method as described above.

BRIEF DESCRIPTION OF THE DRAWINGS

Various other advantages and benefits will become apparent to those skilled in the art by reading detailed descriptions of optional embodiments hereinafter. Drawings are only for the purpose of illustrating optional embodiments and are not construed as limiting the present disclosure. Throughout the drawings, a same component is denoted by a same reference sign.

DETAILED DESCRIPTION

Figure 1:
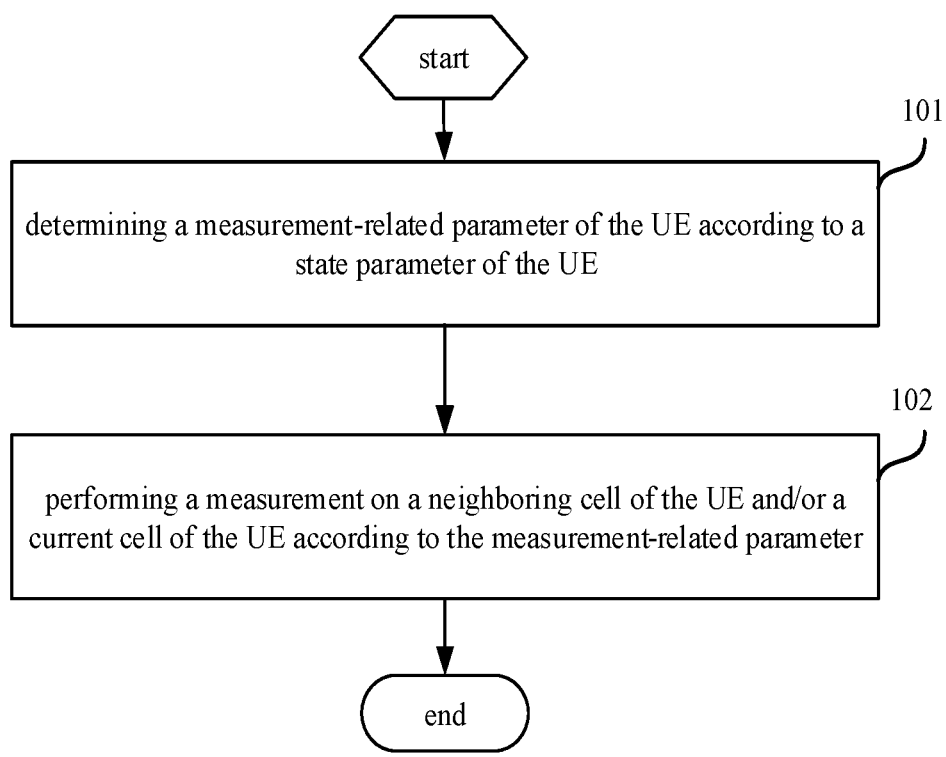
FIG. 1 is a flowchart of a measurement method according to an embodiment of the present disclosure.

In order to make objectives, technical solutions and advantages of the present disclosure clearer, the technical solutions in embodiments of the present disclosure will be clearly and completely described below in conjunction with drawings for the embodiments of the present disclosure. It is obvious that the described embodiments are only a part of the embodiments of the present disclosure, but not all of the embodiments of the present disclosure. All other embodiments obtained by a person of ordinary skill in the art without creative effort based on the embodiments of the present disclosure shall fall within the protection scope of the present disclosure.

The terms "include" and "have" and any variant in the specification and claims of the present disclosure are intended to cover nonexclusive inclusions. For example, a process, method, system, product or equipment including a series of steps or units is not limited to those steps or units which are clearly listed, but may include other steps or units which are not clearly listed or intrinsic to the process, the method, the product or the equipment.

With the development of intelligent UEs, currently sensors on one UE are increasingly more, and are becoming more intelligent. In many situations and scenarios, the UE can accurately know whether it is in a mobile state, a mobile speed and related mobile information of the UE. In addition, the UE carries more sensors to obtain information such as a mobile state, environmental information, or coverage information of the UE, and then to perform more controls and more optimizations on the behavior of the UE based on the information, such as optimizations performed on measurement for a UE in an idle mode and in an inactive mode, thereby achieving the objective of power saving.

For this type of UE, a network may configure multiple sets of trigger measurement parameters. The UE selects different parameters to trigger idle mode and inactive mode measurements on a cell according to a state of the UE, so that different UEs can choose different parameters according to their own states to perform cell measurements. For a scenario where states of some UEs do not change frequently, idle mode and inactive mode measurements can be saved, thereby achieving the purpose of power saving. When normal measurement parameters are required in a case that a mobility state of the UE, an environment where the UE is located, or coverage information of the UE changes, or in a case that a sensor of the UE detects other related changes, the UE recovers the normal measurement parameters.

A measurement method and a User Equipment provided by embodiments of the present disclosure optimize and re-design the existing idle mode and inactive mode measurements, so that a stationary UE or a UE moving at a low speed can achieve the objective of power saving.

In a Long Term Evolution (LTE) system, the Technical Specification (TS) 36.304 about an idle-mode protocol defines configurations related to idle mode measurements and trigger conditions of measurements on neighboring cells.

In a case that it is determined whether to measure an intra-frequency neighboring cell for a cell selection or reselection purpose, when a serving cell meets a condition that a reception level value for cell selection (Srxlev) is greater than $S_{IntraSearchP}$, and a quality value for cell selection (Squal) is greater than $S_{IntraSearchQ}$, the UE chooses not to perform a measurement on the intra-frequency neighboring cell; otherwise, when the two values are smaller than the thresholds, it is necessary to perform the measurement on the intra-frequency neighboring cell. The above parameters $S_{IntraSearchP}$ and $S_{IntraSearchQ}$ are the thresholds for enabling the measurement on the intra-frequency neighboring cell.

For inter-frequency and Inter-RAT (inter-system) scenarios, in a case that an inter-frequency or Inter-RAT cell has a priority higher than a current serving frequency point or RAT (Radio Access Technologies) cell, the UE shall perform measurements on neighboring cells by using measurement parameters defined in TS 36.133. In a case that an inter-frequency or Inter-RAT cell has a priority equal to or lower than the current serving frequency or RAT cell, when a serving cell meets a condition that the Srxlev is greater than $S_{nonIntraSearchP}$, and the Squal is greater than $S_{nonIntraSearchQ}$, the UE chooses not to perform a measurement on a neighboring cell; otherwise, when the two values are smaller than the thresholds, it is required to perform a measurement on a neighboring cell, where $S_{nonIntraSearchP}$ and $S_{nonIntraSearchQ}$ represent thresholds for initiating inter-frequency or Inter-RAT measurement.

In the embodiments of the present disclosure, a network side may refer to a base station, and the base station may be a global system of mobile communication (GSM) or a code division multiple access (CDMA) base transceiver station (BTS), or a wideband code division multiple access (WCDMA) NodeB (NB), or a LTE evolutional Node B (eNB or eNodeB), or a new radio access technical (New RAT or NR) base station, or a relay station or access point, or a future 5G network base station, etc., which is not limited herein.

In the embodiments of the present disclosure, the user equipment (UE) may be a wireless terminal or a wired terminal. A wireless terminal may refer to a device used to provide voice and/or other service data connectivity to a user, a hand-held device with a wireless connection function, or another processing device connected to a wireless modem. A wireless terminal may communicate with one or more core networks via a radio access network (RAN). The wireless terminal may be a mobile terminal, such as a mobile phone (also called cellphone) or a computer equipped with a mobile terminal, such as a portable, pocket-sized, hand-held, computer built-in, or vehicle-mounted mobile device, which exchanges voice and/or data with the radio access network. For example, it may be a personal communication service (PCS) phone, a cordless phone, a session initiation protocol (SIP) phone, a wireless local loop (WLL) station, a personal digital assistant (PDA), or the like. A wireless terminal may also be referred to as a system, a subscriber unit, a subscriber station, a mobile station, a mobile, a remote station, a remote terminal, an access terminal, a user terminal, a user agent, or a user device or user equipment, and is not limited herein.

Reference is made to FIG. 1, which shows a flowchart of a measurement method according to an embodiment of the present disclosure. The method is executed by a UE, and specifically includes the following steps 101 and 102.

Step 101: determining a measurement-related parameter of the UE according to a state parameter of the UE.

The above state parameter of the UE includes any one or more of the following: a type of the UE, a movement of the UE, a maximum movement speed of the UE, a current mobile state of the UE, a current service state of the UE, a state of a network on which the UE currently camps, or a channel state of the UE.

The above measurement-related parameter of the UE includes, but not limited to, at least two measurement thresholds of a serving cell and/or neighboring cells, and at least two measurement periods. A corresponding measurement period may be determined based on a relationship between a signal quality of the serving cell and/or the neighboring cells and a measurement threshold of the serving cell and/or the neighboring cells. Since there may be multiple measurement periods, it is possible to achieve measurements at different densities for UEs under different conditions based on the signal quality of the serving cell and/or the neighboring cells, which can achieve the purpose of power saving.

It should be noted that the above-mentioned serving cell may be a camped cell, or a connected-mode serving cell. The camped cell refers to a cell on which the UE in an idle or inactive mode camps, while the connected-mode serving cell refers to a cell to which the UE in a connected mode is connected.

Step 102: performing a measurement on a neighboring cell of the UE and/or a serving cell of the UE according to the measurement-related parameter.

The above neighboring cell includes intra-frequency neighboring cells (neighbor cells) and other inter-frequency points.

In the embodiments of the present disclosure, since the measurement-related parameter of the UE is related to the state parameter of the UE, different measurement-related parameters can be configured according to the state parameters of the UE. For example, different measurement-related parameters are configured based on a type of the UE, a movement of the UE, a maximum movement speed of the UE, a current mobile state of the UE, a current service state of the UE, a state of a network on which the UE currently camps, or a channel state of the UE. The measurement-related parameter is changed when the state of the UE changes, to differentiate UE in different states. Therefore, power-saving mode measurements can be configured for UEs that are stationary or moving at low speeds, thereby achieving the goal of power saving.

Figure 2:
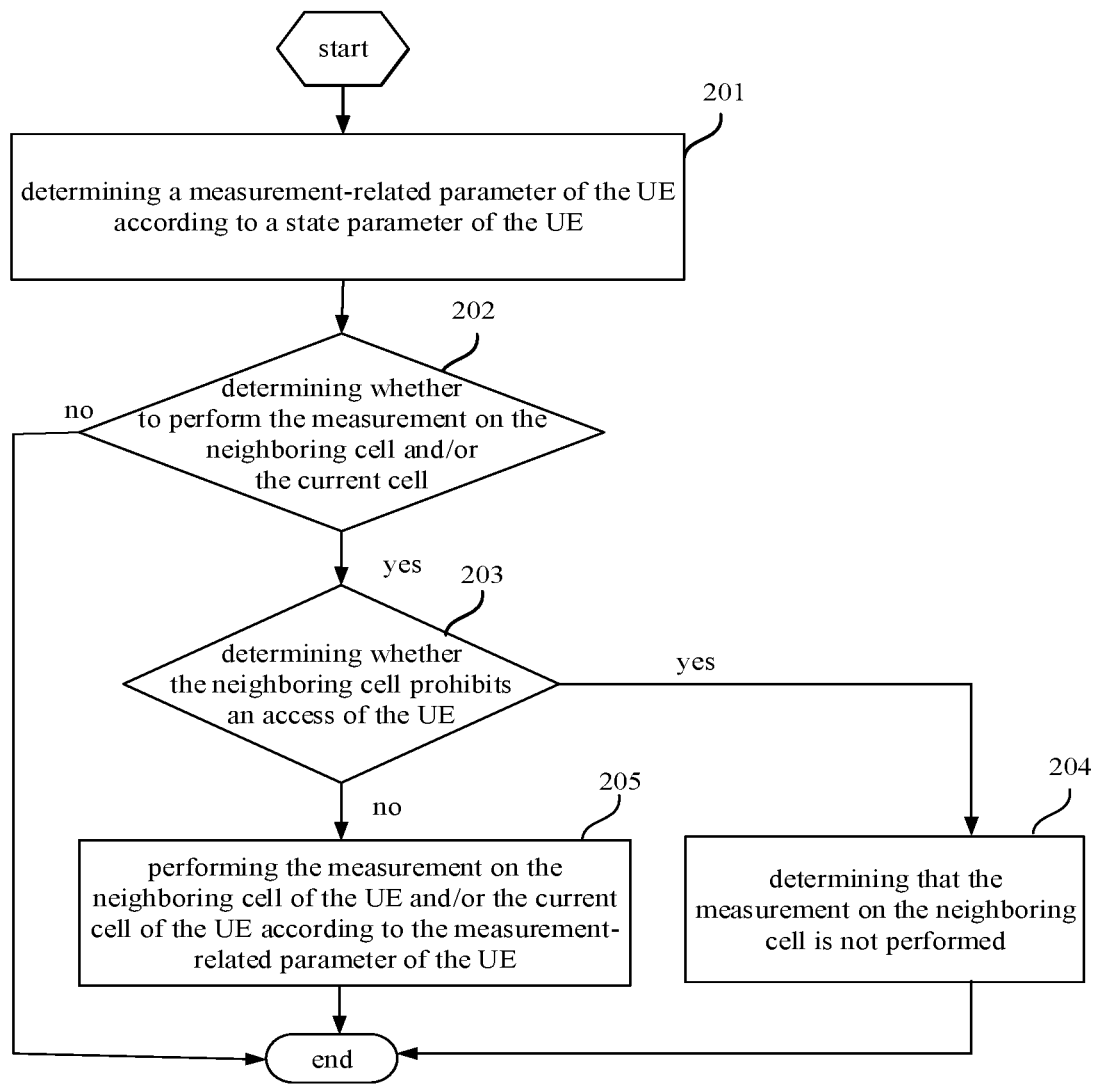
FIG. 2 is a flowchart of a measurement method according to another embodiment of the present disclosure.

Reference is made to FIG. 2, which shows a flowchart of a measurement method according to another embodiment of the present disclosure. The method is executed by a UE and specifically includes the following steps 201 to 205.

Step 201: determining a measurement-related parameter of the UE according to a state parameter of the UE.

The above state parameter of the UE includes any one or more of the followings: a type of the UE, a movement of the UE, a maximum movement speed of the UE, a current mobile state of the UE, a current service state of the UE, a state of a network on which the UE currently camps, or a channel state of the UE.

The above measurement-related parameter of the UE includes, but not limited to, at least two signal quality thresholds of a serving cell and/or neighboring cells, and at least two measurement periods.

Step 202: determining whether to perform the measurement on the neighboring cell and/or the serving cell; proceeding to step 203 when it is determined to perform the measurement on the neighboring cell and/or the serving cell; otherwise, ending the process.

Step 203: determining whether the neighboring cell is a barred cell for the UE (access bar); proceeding to step 204, when the neighboring cell is the barred cell for the UE; and proceeding to step 205, when the neighboring cell allows an access of the UE (access allow), or the neighboring cell is not the barred cell for the UE.

Optionally, in an embodiment of the present disclosure, the UE may obtain a broadcast message and/or a system message (for example, SIB1 (System Information Block 1)) of a neighboring cell, and determine whether an access of the UE to the neighboring cell is barred based on the broadcast message and/or the system message. That is, after determining that the measurement on a neighboring cell or an adjacent frequency point is required to be started according to a certain condition, the UE may read the broadcast message and/or part of the system message of the neighboring cell or the adjacent frequency point, determine whether the UE is barred from accessing to the neighboring cell or the adjacent frequency point according to the broadcast message and/or the system message. If the access is barred, the UE does not reselect the cell, and does not perform the measurement on the neighboring cell or the adjacent frequency point. Even if the UE reselect the cell according to a measurement result after a measurement, the access of the UE to the cell is barred, as this measurement is unnecessary. Therefore, the UE does not need to perform this measurement, thereby saving power consumption of UE.

Optionally, in an embodiment of the present disclosure, the UE may determine whether a neighboring cell or an adjacent frequency point prohibits the UE from accessing according to a first predetermined list stored on a UE side, where the first predetermined list may be an access barred list or an access allowed list. The access barred list records related information of neighboring cells or adjacent frequency points that are barred for access, and the access allowed list records related information of neighboring cells or frequency points that are allowed for access.

It should be noted that, in the embodiments of the present disclosure, the UE may further determine whether the UE is forbidden to access to a neighboring cell by using other methods.

Step 204: determining that the measurement on the neighboring cell is not performed.

Further, in a case that a neighboring cell prohibits the access of the UE, the related information of the neighboring cell is deleted from a fourth predetermined list, and whether to perform the measurement on the neighboring cell or the adjacent frequency point is not determined again subsequently after the related information of the neighboring cell or the adjacent frequency point is deleted from the fourth predetermined list. The fourth predetermined list may be an access allowed list, for example, the fourth predetermined list may be a list of neighboring cells or neighboring frequencies.

Further, in a case that a neighboring cell prohibits the access of the UE, the related information of the neighboring cell is saved in a fifth predetermined list, and the fifth predetermined list may be an access barred list.

Step 205: performing the measurement on the neighboring cell of the UE and/or the serving cell of the UE according to the measurement-related parameter of the UE.

Further, in a case that a neighboring cell allows the UE to access, or does not prohibit the UE from accessing, the related information of the neighboring cell or the adjacent frequency point is saved in a second predetermined list, and the second predetermined list is an access allowed list, so that when a measurement is performed again on the neighboring cell subsequently, a corresponding broadcast message or part of the system message may be not required to be read, and whether the neighboring cell or the adjacent frequency point prohibits the UE from accessing is directly determined according to the second predetermined list.

Further, in a case that a neighboring cell allows the UE to access, or does not prohibit the UE from accessing, the related information of the neighboring cell is deleted from a third predetermined list, and the third predetermined list is an access barred list, so that when a measurement is performed subsequently, a corresponding broadcast message or part of the system message may be not required to be read, and whether the neighboring cell or the adjacent frequency point prohibits the UE from accessing is directly determined according to the third predetermined list.

In the embodiments of the present disclosure, since the measurement-related parameter of the UE is associated to the state parameter of the UE, different measurement-related parameters can be configured according to the state parameters of the UE, so as to differentiate the UE in different states. Therefore, a power-saving mode measurement can be configured for UE that is stationary or moving at a low speed, thereby achieving the goal of power saving.

Further, after a UE determines that the measurement on a neighboring cell or an adjacent frequency point is required to be started according to a certain condition, the UE detects whether a selected or reselected neighboring cell or adjacent frequency point prohibits the UE from accessing, if so, does not perform the measurement on the neighboring cell or the adjacent frequency point, and if not, continues performing the measurement on the neighboring cell or the adjacent frequency point. Therefore, the objective of power saving is further achieved.

Figure 3:
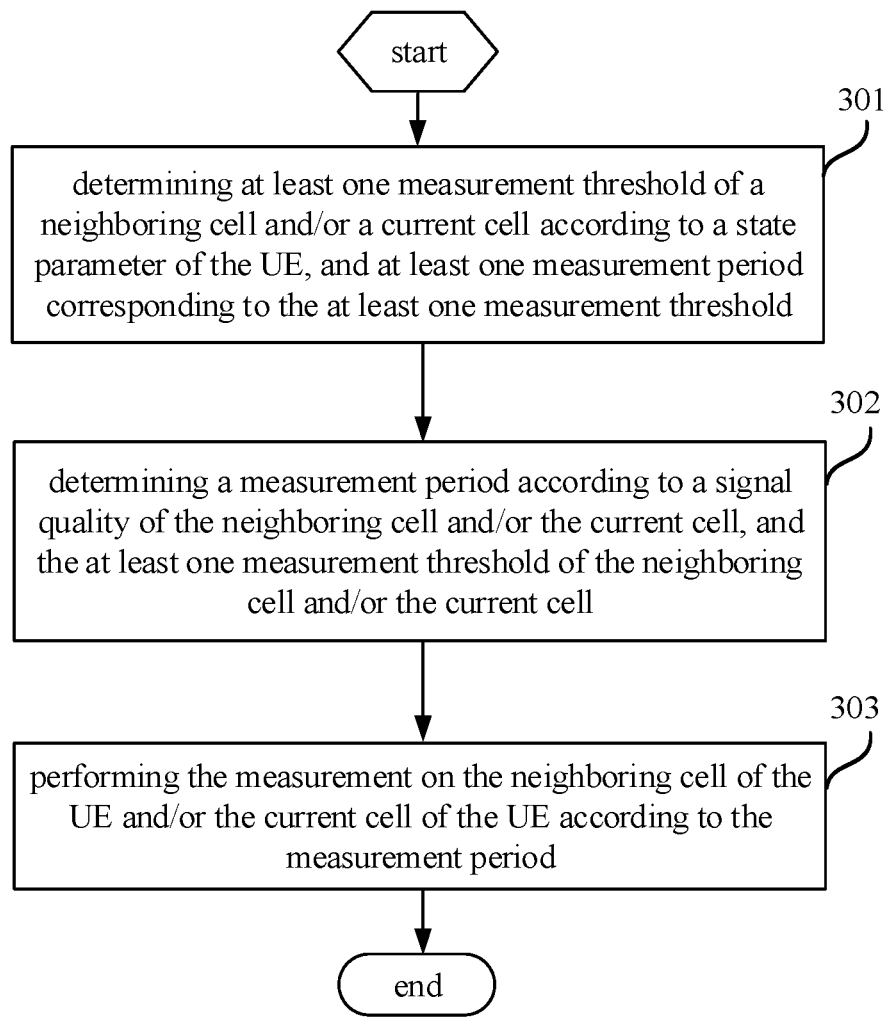
FIG. 3 is a flowchart of a measurement method according to another embodiment of the present disclosure.

Reference is made to FIG. 3, which is a flowchart of a measurement method according to another embodiment of the present disclosure. The method is executed by a UE, and specifically includes the following steps 301 to 303.

Step 301: determining at least one measurement threshold of a neighboring cell and/or a serving cell according to a state parameter of the UE, and at least one measurement period corresponding to the at least one measurement threshold.

The above state parameter of the UE includes any one or more of the followings: a type of the UE, a movement of the UE, a maximum movement speed of the UE, a current mobile state of the UE, a current service state of the UE, a state of a network on which the UE currently camps, or a channel state of the UE.

The at least one measurement threshold of the neighboring cell and/or the serving cell is configured by a network side, or determined in a predefined manner.

The above at least one measurement period is configured by the network side or determined in a predefined manner.

Step 302: determining a corresponding measurement period according to a signal quality of the neighboring cell and/or the serving cell, and the at least one measurement threshold of the neighboring cell and/or the serving cell.

As an example, at least two measurement thresholds (such as at least two RSRP or RSRQ thresholds) are defined according to different state parameters of the UE, and an example is given that two measurement thresholds are defined by a UE.

In a case that a signal quality (Reference Signal Received Power RSRP or Reference Signal Received Quality RSRQ) of a serving cell is larger than a certain threshold 1-1 (or smaller than the certain threshold 1-1), and/or a signal quality of a neighboring cell is larger than a certain threshold 1-2 (or smaller than the certain threshold 1-2), a periodic measurement on the serving cell and/or the neighboring cell is started, and a measurement period is period 1.

In a case that a signal quality (RSRP or RSRQ) of a serving cell is larger than a certain threshold 2-1 (or smaller than the certain threshold 2-1), and/or a signal quality of a neighboring cell is larger than a certain threshold 2-2 (or smaller than the certain threshold 2-2), a periodic measurement on the serving cell and/or the neighboring cell is started, and a measurement period is period 2.

The aforementioned thresholds 1-1, 1-2, 2-1, and 2-2 may all be RSRP thresholds, or RSRQ thresholds, or some of the thresholds may be RSRP thresholds while the other thresholds may be RSRQ thresholds.

It should be noted that a case where the UE configures three or more measurement thresholds and corresponding measurement periods according to the state parameter is similar to the above example, and is not described herein again.

Step 303: performing the measurement on the neighboring cell of the UE and/or the serving cell of the UE according to the measurement period.

Prior to step 301, the method further includes determining whether the UE has a behavioral capability; when the UE has the behavioral capability, determining a measurement threshold of a neighboring cell and/or a serving cell corresponding to the UE according to the state parameter of the UE, and a measurement period corresponding to the measurement threshold, and performing the measurement on the neighboring cell of the UE and/or the serving cell of the UE according to the measurement threshold and the measurement period; and when the UE does not have the behavioral capability, performing the measurement on the neighboring cell and/or the serving cell according to a measurement-related parameter configured by the network. The behavioral capability means that the UE is capable of determining a measurement threshold of the neighboring cell and/or the serving cell according to the state parameter of the UE, and the measurement period corresponding to the measurement threshold, and performing the measurement on the neighboring cell of the UE and/or the serving cell of the UE according to the measurement threshold and the measurement period.

Optionally, in an embodiment of the present disclosure, the method further includes: obtaining, by the UE, enable information or disable information of the behavioral capability configured by the network side, where the enable information of the behavioral capability indicates that the UE has the behavioral capability, and the disable information of the behavioral capability indicates that the UE does not have the behavioral capability.

Optionally, in an embodiment of the present disclosure, the obtaining the enable information or the disable information of the behavioral capability configured by the network side includes: obtaining the enable information or the disable information of the behavioral capability configured by the network side through at least one of a broadcast message or a system message, or through a radio resource control (RRC) message, such as an RRC release message, an RRC suspending (suspending or pending) message, and an RRC reconfiguration message.

In the embodiments of the present disclosure, the UE can configure at least two measurement thresholds according to a state parameter and measurement periods corresponding to the at least two measurement thresholds, so that the UE may determine a corresponding measurement period based on a relationship between a signal quality of the serving cell and/or the neighboring cells and the at least two measurement thresholds. Therefore, it is able to achieve measurements at different densities for UEs under different conditions, and achieve the purpose of power saving.

Embodiments of the present disclosure further provides a User Equipment (UE). Since principles of the UE to solve problems are similar to those of the measurement method in the embodiments of the present disclosure, implementations of the UE can refer to the implementations of the method, and repetitions are not described again.

Figure 4:
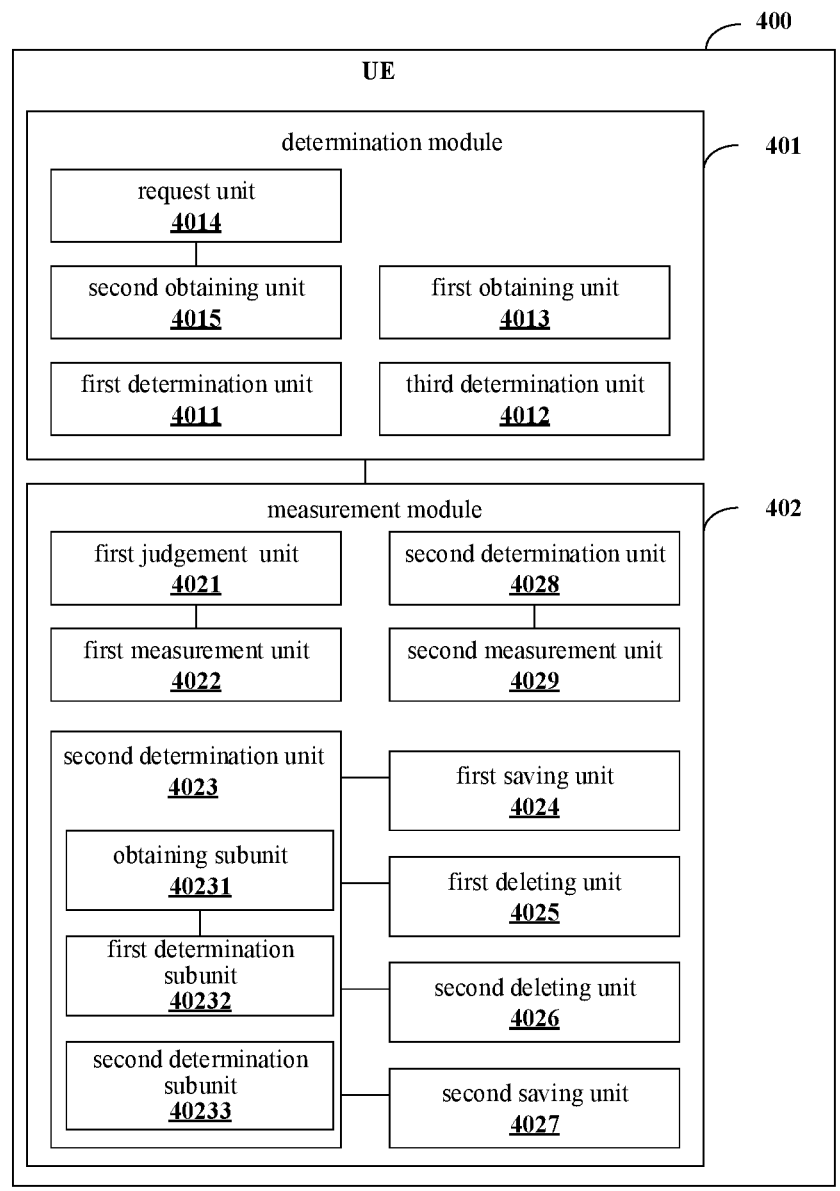
FIG. 4 is a schematic diagram of a UE according to an embodiment of the present disclosure.

Reference is made to FIG. 4, which shows a structure of a UE according to an embodiment. The UE 400 includes: a determination module 401, configured to determine a measurement-related parameter of the UE according to a state parameter of the UE; and a measurement module 402 configured to perform a measurement on a neighboring cell of the UE and/or a serving cell of the UE according to the measurement-related parameter.

Optionally, the state parameter of the UE includes any one or more of the following: a type of the UE, a movement of the UE, a maximum movement speed of the UE, a current mobile state of the UE, a current service state of the UE, a state of a network on which the UE currently camps, or a channel state of the UE.

Optionally, referring to FIG. 4 again, the measurement module 402 includes: a first judgement unit 4021 configured to judge whether to perform the measurement on the neighboring cell and/or the serving cell; and a first measurement unit 4022 configured to perform the measurement on the neighboring cell of the UE and/or the serving cell of the UE according to the measurement-related parameter of the UE, in a case that it is determined to perform the measurement on the neighboring cell and/or the serving cell.

Optionally, referring to FIG. 4 again, the measurement module 402 further includes a second determination unit 4023, which is configured to determine whether the neighboring cell is a barred cell for the UE; determine that the measurement on the neighboring cell is not performed, in a case that the neighboring cell is the barred cell for the UE; or perform the measurement on the neighboring cell of the UE according to the measurement-related parameter of the UE, in a case that the neighboring cell allows the access of the UE, or the neighboring cell is not the barred cell for the UE.

Optionally, continuing to refer to FIG. 4, the second determination unit 4023 includes: an obtaining subunit 40231 configured to obtain at least one of a broadcast message or a system message of the neighboring cell; and a first determination subunit 40232 configured to determine whether the neighboring cell is the barred cell for the UE according to at least one of the broadcast message or the system message.

Optionally, referring to FIG. 4 again, the second determination unit 4023 further includes: a second determination subunit 40233 configured to determine whether the neighboring cell is the barred cell for the UE according to a first predetermined list saved on a UE side.

Optionally, continuing to refer to FIG. 4, the measurement module 402 further includes: a first saving unit 4024 configured to save related information of the neighboring cell to a second predetermined list, in a case that the neighboring cell allows the access of the UE, or the neighboring cell is not the barred cell for the UE; or a first deleting unit 4025 configured to delete related information of the neighboring cell from a third predetermined list, in a case that the neighboring cell allows the access of the UE, or the neighboring cell is not the barred cell for the UE.

Optionally, continuing to refer to FIG. 4, the measurement module 402 further includes: a second deleting unit 4026 configured to delete related information of the neighboring cell from a fourth predetermined list, in a case that the neighboring cell is the barred cell for the UE; or a second saving unit 4027 configured to save related information of the neighboring cell to a fifth predetermined list, in a case that the neighboring cell is the barred cell for the UE.

Optionally, continuing to refer to FIG. 4, the determination module 401 includes: a first determination unit 4011 configured to determine, according to the state parameter of the UE, at least one measurement threshold of the neighboring cell and/or the serving cell corresponding to the state parameter of the UE, and at least one measurement period corresponding to the at least one measurement threshold.

The measurement module 402 further includes: a second determination unit 4028 configured to determine a corresponding measurement period according to a signal quality of the neighboring cell and/or the serving cell, and the at least one measurement threshold of the neighboring cell and/or the serving cell; and a second measurement unit 4029 configured to perform the measurement on the neighboring cell of the UE and/or the serving cell of the UE in accordance with the measurement period.

Optionally, the at least one measurement threshold of the neighboring cell and/or the serving cell is configured by a network side, or determined in a predefined manner.

Optionally, the at least one measurement period is configured by a network side, or determined in a predefined manner.

Optionally, continuing to refer to FIG. 4, the determination module 401 further includes: a third determination unit 4012. The third determination unit 4012 is configured to determine whether the UE has a behavioral capability, where the behavioral capability comprises that the UE is capable of determining measurement thresholds of the neighboring cell and/or the serving cell according to the state parameter of the UE, and measurement periods corresponding to the measurement thresholds, and performing the measurement on the neighboring cell of the UE and/or the serving cell of the UE according to the measurement thresholds and the measurement periods; determine the measurement thresholds of the neighboring cell and/or the serving cell corresponding to the UE, and the measurement periods corresponding to the measurement thresholds according to the state parameter of the UE, determine a corresponding period according to a signal quality of the neighboring cell and/or the serving cell, and at least one of the measurement thresholds of the neighboring cell and/or the serving cell, and perform the measurement on the neighboring cell of the UE and/or the serving cell of the UE in accordance with the measurement period, in a case that the UE has the behavioral capability; or perform the measurement on the neighboring cell of the UE and/or the serving cell of the UE according to a measurement-related parameter configured by a network, in a case that the UE does not have the behavioral capability.

Optionally, continuing to refer to FIG. 4, the determination module 401 further includes: a first obtaining unit 4013 configured to obtain, by the UE, enable information or disable information of the behavioral capability configured by a network side, where the enable information of the behavioral capability indicates that the UE has the behavioral capability, and the disable information of the behavioral capability indicates that the UE does not have the behavioral capability.

Optionally, the first obtaining unit 4013 is further configured to obtain the enable information or the disable information of the behavioral capability configured by the network side via at least one of a broadcast message or a system message; or obtain the enable information or the disable information of the behavioral capability configured by the network side via a radio resource control RRC message.

Optionally, continuing to refer to FIG. 4, the determination module 401 further includes: a request unit 4014 configured to transmit a behavioral capability request message to the network side; and a second obtaining unit 4015 configured to obtain a behavioral capability configured by the network side for the UE according to the behavioral capability request message.

The UE provided by the embodiments of the present disclosure can implement the foregoing method embodiments, and implementation principles and technical effects thereof are similar to those in the foregoing method embodiments, which are not described herein again in the embodiments of the present disclosure.

Figure 5:
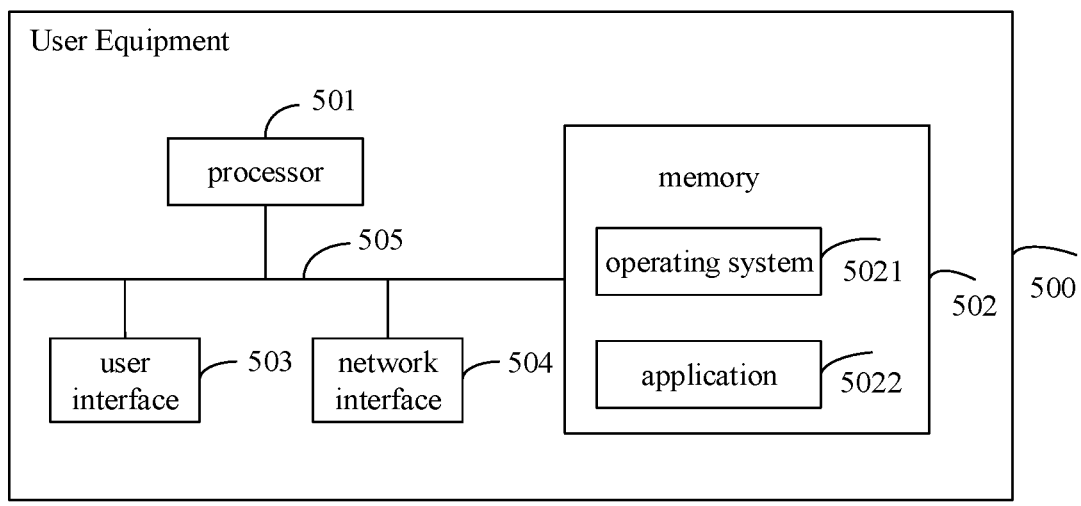
FIG. 5 is a schematic diagram of a UE according to another embodiment of the present disclosure.

FIG. 5 is a schematic diagram of a user equipment according to another embodiment of the present disclosure. As shown in FIG. 5, the user equipment (UE) 500 shown in FIG. 5 includes: at least one processor 501, a memory 502, at least one network interface 504, and a user interface 503. Various components in the UE 500 are coupled to each other via a bus system 505. It can be understood that the bus system 505 is configured to implement connections and communications between these components. In addition to the data bus, the bus system 505 includes a power bus, a control bus, and a status signal bus. For clarity, various buses are marked as the bus system 505 in FIG. 5.

The user interface 503 may include a display, or a click device (e.g., a mouse, or a trackball), a touchpad, or a touch screen, etc.

It is understood that, the memory 502 provided by embodiments of the present disclosure may be a volatile memory or a non-volatile memory, or may include both of the volatile memory and the non-volatile memory. The non-volatile memory may be a read-only memory (ROM), a programmable ROM (PROM), an erasable PROM (EPROM), an electrically EPROM (EEPROM) or a flash memory. The volatile memory may be a random access memory (RAM), which is used as an external cache. By way of example and without any limitation, many forms of RAMs may be used, such as static RAM (SRAM), dynamic RAM (DRAM), synchronous DRAM (SDRAM), double data rate SDRAM (DDRSDRAM), enhanced SDRAM (ESDRAM), Synchlink DRAM (SLDRAM) and direct Rambus RAM (DRRAM). The memory 502 of the system and method described herein is meant to include, without limitation, these and any other suitable types of memories.

In some implementations, the memory 502 stores the following elements: executable module or data structure, or a subset or extension set thereof, such as an operating system 5021 and an application 5022.

The operating system 5021 includes various system programs, such as framework layer programs, core library layer programs and driver layer programs, to implement various fundamental services and process hardware-based tasks. The application 5022 includes various applications, such as a media player and a browser, to implement a variety of application services. The program implementing the method according to embodiments of the present disclosure may be included in the application 5022.

In an embodiment of the present disclosure, by calling and executing a program or instruction stored in the memory 502, specifically, the program or the instruction stored in the application 5022, the following steps are implemented:

determining a measurement-related parameter of the UE according to a state parameter of the UE; and performing a measurement on a neighboring cell of the UE and/or a serving cell of the UE according to the measurement-related parameter.

The method disclosed in the foregoing embodiments of the present disclosure may be applied to the processor 501 or implemented by the processor 501. The processor 501 may be an integrated circuit with signal processing capability. During an implementation process, steps of the methods may be realized in form of hardware by integrated logical circuits in the processor 501, or in form of software by instructions. The processor 501 may be a general purpose processor, digital signal processor (DSP), application specific integrated circuit (ASIC), field programmable gate array (FPGA) or other programmable logic device, discrete gate or transistor logic device, discrete hardware transistor logic device, discrete hardware component, that is capable of implementing or executing the various methods, steps and logic block diagrams disclosed in the embodiments of the present disclosure. The general purpose processor may be a microprocessor, or any conventional processor, etc. The steps of the methods disclosed with reference to the embodiments of the present disclosure may be embodied in hardware in the form of a coding processor, or performed by the hardware in the coding processor and the software modules in combination. The software modules may reside in wellestablished storage medium in the art, such as a RAM, flash memory, ROM, PROM or EEPROM, register, etc. The storage medium resides in the memory 502. The processor 501 reads information from the memory 502 and performs the steps of the methods with its hardware.

It is understood that, the embodiments described in the present disclosure may be implemented by hardware, software, firmware, middleware, microcode or a combination thereof. For hardware implementation, processing units may be implemented in one or more application specific integrated circuits (ASIC), digital signal processor (DSP), DSP device (DSPD), programmable logic device (PLD), fieldprogrammable gate array (FPGA), general purpose processor, controller, microcontroller, microprocessor, other electronic unit configured to perform the function described in the present disclosure or a combination thereof.

For software implementation, the technical solutions described in the embodiments of the present disclosure may be implemented by a module (e.g., process, function, etc.) configured to perform the function described in the embodiments of the present disclosure. Software codes may be stored in a memory and executed by the processor. The memory may be implemented internal or external to the processor.

Optionally, when the measurement program is executed by the processor 501, the following steps may further be implemented:

determining whether to perform the measurement on the neighboring cell and/or the local cell; and performing the measurement on the neighboring cell of the UE and/or the serving cell of the UE according to the measurement-related parameter of the UE, in a case that it is determined to perform the measurement on the neighboring cell and/or the serving cell Optionally, the measurement program is executed by the processor 501 to further implement the following steps:

determining whether the neighboring cell is a barred cell for the UE;

determining that the measurement on the neighboring cell is not performed, in a case that the neighboring cell is the barred cell for the UE; or performing the measurement on the neighboring cell of the UE according to the measurement-related parameter of the UE, in a case that the neighboring cell allows an access of the UE, or the neighboring cell is not the barred cell for the UE.

Optionally, the measurement program is executed by the processor 501 to further implement the following steps:

obtaining at least one of a broadcast message or a system message of the neighboring cell; and determining whether the neighboring cell is the barred cell for the UE according to at least one of the broadcast message or the system message.

Optionally, the measurement program is executed by the processor 501 to further implement the following steps:

determining whether the neighboring cell is the barred cell for the UE according to a first predetermined list saved on a UE side.

Optionally, the measurement program is executed by the processor 501 to further implement the following steps:

saving related information of the neighboring cell to a second predetermined list, in a case that the neighboring cell allows the access of the UE, or the neighboring cell is not the barred cell for the UE; or deleting related information of the neighboring cell from a third predetermined list, in a case that the neighboring cell allows the access of the UE, or the neighboring cell is not the barred cell for the UE.

Optionally, the measurement program is executed by the processor 501 to further implement the following steps:

deleting related information of the neighboring cell from a fourth predetermined list, in a case that the neighboring cell is the barred cell for the UE; or saving related information of the neighboring cell to a fifth predetermined list, in a case that the neighboring cell is the barred cell for the UE.

Optionally, the measurement program is executed by the processor 501 to further implement the following steps:

determining, according to the state parameter of the UE, at least one measurement threshold of the neighboring cell and/or the serving cell corresponding to the state parameter of the UE, and at least one measurement period corresponding to the at least one measurement threshold;

determining a corresponding measurement period according to a signal quality of the neighboring cell and/or the serving cell, and the at least one measurement threshold of the neighboring cell and/or the serving cell; and performing the measurement on the neighboring cell of the UE and/or the serving cell of the UE in accordance with the measurement period.

Optionally, when the measurement program is executed by the processor 501, the following steps may further be implemented:

determining whether the UE has a behavioral capability, where the behavioral capability comprises that the UE is capable of determining measurement thresholds of the neighboring cell and/or the serving cell according to the state parameter of the UE, and measurement periods corresponding to the measurement thresholds, and performing the measurement on the neighboring cell of the UE and/or the serving cell of the UE according to the measurement thresholds and the measurement periods;

determining the measurement thresholds of the neighboring cell and/or the serving cell corresponding to the UE, and the measurement periods corresponding to the measurement thresholds according to the state parameter of the UE, determining a corresponding period according to a signal quality of the neighboring cell and/or the serving cell, and at least one of the measurement thresholds of the neighboring cell and/or the serving cell, and performing the measurement on the neighboring cell of the UE and/or the serving cell of the UE in accordance with the measurement period, in a case that the UE has the behavioral capability; or performing the measurement on the neighboring cell of the UE and/or the serving cell of the UE according to a measurement-related parameter configured by a network, in a case that the UE does not have the behavioral capability.

Optionally, when the measurement program is executed by the processor 501, the following steps may further be implemented:

obtaining enable information or disable information of the behavioral capability configured by a network side, where the enable information of the behavioral capability indicates that the UE has the behavioral capability, and the disable information of the behavioral capability indicates that the UE does not have the behavioral capability.

An embodiment of the present disclosure further provides a computer-readable storage medium. The computer-readable storage medium stores a measurement program, and when the measurement program is executed by a processor, steps in the measurement method described above are implemented.

A person skilled in the art may be aware that, the exemplary units and algorithm steps described in connection with the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the disclosure.

It may be clearly understood by a person skilled in the art that, for ease of description and conciseness, for a detailed working process of the foregoing system, apparatus, and unit, reference may be made to a corresponding process in the foregoing method embodiments, and details are not described herein again.

In the several embodiments provided in the present application, it should be understood that the disclosed device and method may be implemented in other manners. For example, the described device embodiment is merely exemplary. For example, the unit division is merely logical function division and may be other division in actual implementation. For example, a plurality of units or components may be combined or integrated into another system, or some features may be neglected or not performed. In addition, the displayed or discussed mutual couplings or direct couplings or communication connections may be implemented through some interfaces. The indirect couplings or communication connections between the devices or units may be implemented in electric, mechanical, or other forms.

The units described as separate parts may or may not be physically separate, and parts displayed as units may or may not be physical units, that is, may be located in one position, or may be distributed on a plurality of network units. A part or all of the units may be selected according to actual needs to achieve the objectives of the solutions of the embodiments.

In addition, functional units in the embodiments of the present disclosure may be integrated into one processing unit, or each of the units may exist alone physically, or two or more units may be integrated into one unit.

If the functions are implemented in a form of a software functional unit and sold or used as an independent product, the functions may be stored in a computer-readable storage medium. Based on such an understanding, essential part or the part contributing to the prior art of the technical solutions of the present disclosure, or a part of the technical solutions may be implemented in a form of a software product. The software product is stored in a storage medium, and includes several instructions for instructing a computer device (which may be a personal computer, a server, or a network device) to perform all or a part of the steps of the methods described in the embodiments of the disclosure. The foregoing storage medium includes any medium that may store program code, such as a universal serial bus (USB) flash drive, a mobile hard disk, an ROM, an RAM, a magnetic disk, or an optical disc.

The above descriptions are merely specific implementations of the present disclosure, but the scope of the present disclosure is not limited thereto. Any modifications and substitutions easily made by a person of ordinary skill in the art without departing from the technical principle of the present disclosure shall fall within the scope of the present disclosure. Therefore, the scope of the present disclosure shall be determined by the claims.

What is claimed is:

1. A measurement method, applied to a User Equipment (UE), and comprising:

determining a measurement-related parameter of the UE according to a state parameter of the UE; and performing a measurement on a neighboring cell of the UE and/or a serving cell of the UE according to the measurement-related parameter, wherein the determining the measurement-related parameter of the UE according to the state parameter of the UE comprises:

determining, according to the state parameter of the UE, at least one measurement threshold of the neighboring cell and/or the serving cell corresponding to the state parameter of the UE, and at least one measurement period corresponding to the at least one measurement threshold, and the performing the measurement on the neighboring cell of the UE and/or the serving cell of the UE according to the measurement-related parameter comprises:

determining a corresponding measurement period according to a signal quality of the neighboring cell and/or the serving cell, and the at least one measurement threshold of the neighboring cell and/or the serving cell; and performing the measurement on the neighboring cell of the UE and/or the serving cell of the UE in accordance with the measurement period.

2. The method according to claim 1, wherein the state parameter of the UE comprises any one or more of the following:

a type of the UE, a movement of the UE, a maximum movement speed of the UE, a current mobile state of the UE, a current service state of the UE, a state of a network on which the UE currently camps, or a channel state of the UE.

3. The method according to claim 1, wherein the performing the measurement on the neighboring cell of the UE and/or the serving cell of the UE according to the measurement-related parameter comprises:
determining whether to perform the measurement on the neighboring cell and/or the serving cell; and
performing the measurement on the neighboring cell of the UE and/or the serving cell of the UE according to the measurement-related parameter of the UE, in a case that it is determined to perform the measurement on the neighboring cell and/or the serving cell.

4. The method according to claim 3, wherein before performing the measurement on the neighboring cell of the UE according to the measurement-related parameter of the UE, the method further comprises:
determining whether the neighboring cell is a barred cell for the UE;
determining not to perform the measurement on the neighboring cell, in a case that the neighboring cell is the barred cell for the UE; or
performing the measurement on the neighboring cell of the UE according to the measurement-related parameter of the UE, in a case that the neighboring cell allows an access of the UE, or the neighboring cell is not the barred cell for the UE.

5. The method according to claim 4, wherein the determining whether the neighboring cell is the barred cell for the UE comprises:
obtaining at least one of a broadcast message or a system message of the neighboring cell; and
determining whether the neighboring cell is the barred cell for the UE according to at least one of the broadcast message or the system message.

6. The method according to claim 4, wherein the determining whether the neighboring cell is the barred cell for the UE comprises:
determining whether the neighboring cell is the barred cell for the UE according to a first predetermined list saved on a UE side.

7. The method according to claim 4, further comprising:
saving related information of the neighboring cell to a second predetermined list, in a case that the neighboring cell allows the access of the UE, or the neighboring cell is not the barred cell for the UE;
deleting related information of the neighboring cell from a third predetermined list, in a case that the neighboring cell allows the access of the UE, or the neighboring cell is not the barred cell for the UE;
deleting related information of the neighboring cell from a fourth predetermined list, in a case that the neighboring cell is the barred cell for the UE; or
saving related information of the neighboring cell to a fifth predetermined list, in a case that the neighboring cell is the barred cell for the UE.

8. The method according to claim 1, wherein:
the at least one measurement threshold of the neighboring cell and/or the serving cell is configured by a network side, or determined in a predefined manner; or
the at least one measurement period is configured by a network side, or determined in a predefined manner.

9. The method according to claim 1, further comprising:
determining whether the UE has a behavioral capability, wherein the behavioral capability comprises that the UE is capable of determining measurement thresholds of the neighboring cell and/or the serving cell according to the state parameter of the UE, and measurement periods corresponding to the measurement thresholds, and performing the measurement on the neighboring cell of the UE and/or the serving cell of the UE according to the measurement thresholds and the measurement periods;
determining the measurement thresholds of the neighboring cell and/or the serving cell corresponding to the UE, and the measurement periods corresponding to the measurement thresholds according to the state parameter of the UE, determining a corresponding period according to a signal quality of the neighboring cell and/or the serving cell, and at least one of the measurement thresholds of the neighboring cell and/or the serving cell, and performing the measurement on the neighboring cell of the UE and/or the serving cell of the UE in accordance with the measurement period, in a case that the UE has the behavioral capability; or
performing the measurement on the neighboring cell of the UE and/or the serving cell of the UE according to a measurement-related parameter configured by a network, in a case that the UE does not have the behavioral capability.

10. The method according to claim 9, wherein before determining whether the UE has the behavioral capability, the method further comprises:
obtaining enable information or disable information of the behavioral capability configured by a network side, wherein the enable information of the behavioral capability indicates that the UE has the behavioral capability, and the disable information of the behavioral capability indicates that the UE does not have the behavioral capability.

11. The method according to claim 10, wherein the obtaining the enable information or the disable information of the behavioral capability configured by the network side comprises:
obtaining the enable information or the disable information of the behavioral capability configured by the network side via at least one of a broadcast message or a system message; or
obtaining the enable information or the disable information of the behavioral capability configured by the network side via a radio resource control RRC message.

12. The method according to claim 9, wherein before determining whether the UE has the behavioral capability, the method further comprises:
transmitting a behavioral capability request message to a network side; and
obtaining the behavioral capability configured by the network side for the UE according to the behavioral capability request message.

13. A user equipment (UE), comprising:
a processor, a memory, and a program that is stored on the memory and executable by the processor, wherein when executing the program, the processor is configured to:
determine a measurement-related parameter of the UE according to a state parameter of the UE; and perform a measurement on a neighboring cell of the UE and/or a serving cell of the UE according to the measurement-related parameter, wherein when determining the measurement-related parameter of the UE according to the state parameter of the UE, the processor is specifically configured to:

determine, according to the state parameter of the UE, at least one measurement threshold of the neighboring cell and/or the serving cell corresponding to the state parameter of the UE, and at least one measurement period corresponding to the at least one measurement threshold, and when performing the measurement on the neighboring cell of the UE and/or the serving cell of the UE according to the measurement-related parameter, the processor is specifically configured to:

determine a corresponding measurement period according to a signal quality of the neighboring cell and/or the serving cell, and the at least one measurement threshold of the neighboring cell and/or the serving cell; and perform the measurement on the neighboring cell of the UE and/or the serving cell of the UE in accordance with the measurement period.

14. The UE according to claim 13, wherein the state parameter of the UE comprises any one or more of the following:

a type of the UE, a movement of the UE, a maximum movement speed of the UE, a current mobile state of the UE, a current service state of the UE, a state of a network on which the UE currently camps, or a channel state of the UE.

15. The UE according to claim 13, wherein the processor is further configured to:

determine whether to perform the measurement on the neighboring cell and/or the serving cell; and perform the measurement on the neighboring cell of the UE and/or the serving cell of the UE according to the measurement-related parameter of the UE, in a case that it is determined to perform the measurement on the neighboring cell and/or the serving cell.

16. The UE according to claim 15, wherein the processor is further configured to:

determine whether the neighboring cell is a barred cell for the UE;

determine not to perform the measurement on the neighboring cell, in a case that the neighboring cell is the barred cell for the UE; or perform the measurement on the neighboring cell of the UE according to the measurement-related parameter of the UE, in a case that the neighboring cell allows an access of the UE, or the neighboring cell is not the barred cell for the UE.

17. The UE according to claim 16, wherein the processor is further configured to:

obtain at least one of a broadcast message or a system message of the neighboring cell; and determine whether the neighboring cell is the barred cell for the UE according to at least one of the broadcast message or the system message.

18. The UE according to claim 16, wherein the processor is further configured to:

determine whether the neighboring cell is the barred cell for the UE according to a first predetermined list saved on a UE side.

19. The UE according to claim 16, wherein the processor is further configured to:

save related information of the neighboring cell to a second predetermined list, in a case that the neighboring cell allows the access of the UE, or the neighboring cell is not the barred cell for the UE;

delete related information of the neighboring cell from a third predetermined list, in a case that the neighboring cell allows the access of the UE, or the neighboring cell is not the barred cell for the UE;

deleted related information of the neighboring cell from a fourth predetermined list, in a case that the neighboring cell is the barred cell for the UE; or save related information of the neighboring cell to a fifth predetermined list, in a case that the neighboring cell is the barred cell for the UE.

20. The UE according to claim 13, wherein the processor is further configured to:

determine whether the UE has a behavioral capability, wherein the behavioral capability comprises that the UE is capable of determining measurement thresholds of the neighboring cell and/or the serving cell according to the state parameter of the UE, and measurement periods corresponding to the measurement thresholds, and perform the measurement on the neighboring cell of the UE and/or the serving cell of the UE according to the measurement thresholds and the measurement periods;

determine the measurement thresholds of the neighboring cell and/or the serving cell corresponding to the UE, and the measurement periods corresponding to the measurement thresholds according to the state parameter of the UE, determine a corresponding period according to a signal quality of the neighboring cell and/or the serving cell, and at least one of the measurement thresholds of the neighboring cell and/or the serving cell, and perform the measurement on the neighboring cell of the UE and/or the serving cell of the UE in accordance with the measurement period, in a case that the UE has the behavioral capability; or perform the measurement on the neighboring cell of the UE and/or the serving cell of the UE according to a measurement-related parameter configured by a network, in a case that the UE does not have the behavioral capability.

* * * * *